United States Patent
Shirooka et al.

(10) Patent No.: US 9,809,253 B2
(45) Date of Patent: Nov. 7, 2017

(54) VEHICLE BODY LOWER PORTION STRUCTURE

(71) Applicant: TOYOTA JIDOSHA KABUSHIKI KAISHA, Toyota-shi (JP)

(72) Inventors: Masakazu Shirooka, Toyota (JP); Teppei Hae, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/026,457

(22) PCT Filed: Nov. 7, 2014

(86) PCT No.: PCT/JP2014/080131
§ 371 (c)(1),
(2) Date: Mar. 31, 2016

(87) PCT Pub. No.: WO2015/079928
PCT Pub. Date: Jun. 4, 2015

(65) Prior Publication Data
US 2016/0236717 A1 Aug. 18, 2016

(30) Foreign Application Priority Data
Nov. 28, 2013 (JP) .................. 2013-246604

(51) Int. Cl.
*B62D 21/15* (2006.01)
*B62D 25/20* (2006.01)

(52) U.S. Cl.
CPC ........... *B62D 21/155* (2013.01); *B62D 25/20* (2013.01); *B62D 25/2018* (2013.01)

(58) Field of Classification Search
CPC ...... B62D 21/155; B62D 21/03; B62D 21/08; B62D 21/15; B62D 25/20; B62D 25/2009; B62D 25/2018
(Continued)

(56) References Cited

U.S. PATENT DOCUMENTS 5,609,386 A * 3/1997 Takahashi .............. B62D 21/09
280/800
6,361,102 B1 * 3/2002 Han ..................... B62D 21/152
296/187.09
(Continued)

FOREIGN PATENT DOCUMENTS

EP 2 060 474 A1 5/2009
JP 9-24863 A 1/1997
(Continued)

OTHER PUBLICATIONS

Office Action dated May 10, 2016 in Japanese Patent Application No. 2013-246604.
(Continued)

*Primary Examiner* — Gregory Blankenship
(74) *Attorney, Agent, or Firm* — Oblon, McClelland, Maier & Neustadt, L.L.P.

(57) ABSTRACT

In a vehicle, a floor member reinforcing member extends in a vehicle longitudinal direction within a closed cross-section portion that is formed by a floor member and a floor panel. The floor member reinforcing member intersects a second floor cross member as seen in plan view. Namely, a portion, that is reinforced by the floor member reinforcing member, of the floor member extends in the vehicle longitudinal direction so as to include a portion, that intersects the second floor cross member, of the floor member. Further, occurrence of bending due to collision load at the portion, that is reinforced by the floor member reinforcing member, of the floor member is suppressed. The reinforced portion of the floor member is displaced toward a vehicle obliquely upper front side following displacement of the second floor cross member toward a vehicle obliquely upper front side.

4 Claims, 5 Drawing Sheets

(58) Field of Classification Search
USPC .............................. 296/187.08, 193.07, 204
See application file for complete search history.

(56) References Cited

U.S. PATENT DOCUMENTS

| | | | | |
|---|---|---|---|---|
| 7,140,642 | B2* | 11/2006 | Ito ......................... | B62D 21/10 |
| | | | | 280/834 |
| 7,188,893 | B2* | 3/2007 | Akasaka ............. | B62D 21/152 |
| | | | | 296/187.08 |
| 8,820,823 | B1* | 9/2014 | Shafer ................... | B62D 25/20 |
| | | | | 296/193.07 |
| 2011/0272969 | A1* | 11/2011 | Mori ...................... | B62D 25/20 |
| | | | | 296/193.07 |
| 2012/0068499 | A1* | 3/2012 | Mildner ............. | B62D 25/2045 |
| | | | | 296/193.07 |
| 2012/0212009 | A1* | 8/2012 | Ishizono ............. | B62D 25/025 |
| | | | | 296/193.07 |
| 2012/0256446 | A1* | 10/2012 | Yasuhara ............... | B62D 21/11 |
| | | | | 296/193.07 |
| 2013/0113238 | A1* | 5/2013 | Mildner .............. | B62D 25/082 |
| | | | | 296/204 |
| 2013/0341969 | A1* | 12/2013 | Fujii ................. | B62D 25/2036 |
| | | | | 296/193.07 |
| 2014/0021744 | A1* | 1/2014 | Imamura ............. | B62D 21/157 |
| | | | | 296/187.08 |
| 2015/0008703 | A1* | 1/2015 | Furusaki ............. | B62D 21/152 |
| | | | | 296/187.08 |
| 2015/0197289 | A1* | 7/2015 | Kurokawa ........... | B62D 29/005 |
| | | | | 296/187.08 |
| 2015/0251700 | A1* | 9/2015 | Choi ...................... | B62D 25/20 |
| | | | | 296/204 |
| 2016/0001817 | A1* | 1/2016 | Atsumi ................. | B60R 19/023 |
| | | | | 296/187.09 |
| 2016/0052561 | A1* | 2/2016 | Atsumi .............. | B62D 25/2018 |
| | | | | 296/187.08 |
| 2016/0144897 | A1* | 5/2016 | Cho ....................... | B62D 21/08 |
| | | | | 296/204 |
| 2016/0236717 | A1* | 8/2016 | Shirooka ................ | B62D 25/20 |

FOREIGN PATENT DOCUMENTS

| | | |
|---|---|---|
| JP | 2002-2528 A | 1/2002 |
| JP | 2002-347683 A | 12/2002 |
| JP | 2005-212503 A | 8/2005 |
| JP | 2009-119997 A | 6/2009 |
| JP | 2012-11856 A | 1/2012 |

OTHER PUBLICATIONS

International Search Report dated Jan. 28, 2015, in PCT/JP2014/080131 filed Nov. 7, 2014.

Written Opinion of the International Searching Authority dated Jan. 28, 2015, in PCT/JP2014/080131 filed Nov. 7, 2014.

* cited by examiner

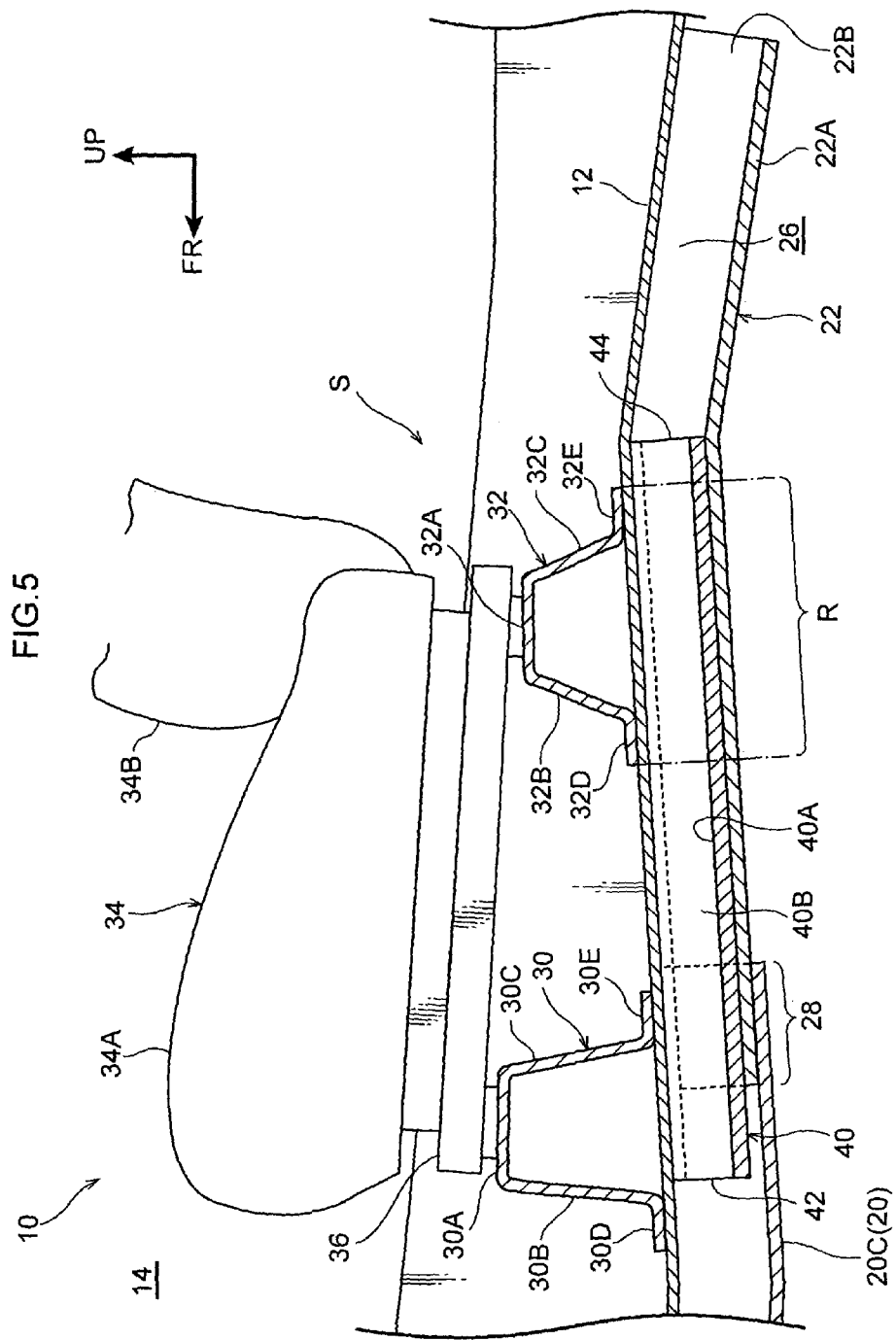

VEHICLE BODY LOWER PORTION STRUCTURE

TECHNICAL FIELD

The present invention relates to a vehicle body lower portion structure.

BACKGROUND ART

In the vehicle body lower portion structure disclosed in Japanese Patent Application Laid-Open (JP-A) No. 2005-212503 (Patent Document 1), floor cross members and extended portions of front side members intersect as seen in plan view, and the both nip a floor panel therebetween and are fastened by bolts and nuts. Due thereto, the separation strength at the joined portions of the front side members and the floor cross members can be improved.

Note that, generally, the front end portion of a floor member, that extends in the vehicle longitudinal direction, is joined to the rear end portion of the extended portion of the front side member. Further, plural floor cross members are provided in the vehicle longitudinal direction. The floor cross member, that structures the vehicle rear side mounting portion of a vehicle seat, intersects the floor member as seen in plan view.

SUMMARY OF INVENTION

Technical Problem

At the time of a vehicle front collision, collision load toward the vehicle rear side is inputted to the floor member via the front side member. At this time, due to this collision load, the floor member tends to bend so as to become convex toward the vehicle lower side.

Further, at the time of a vehicle front collision, because a seated vehicle occupant moves toward the vehicle front side due to inertia, the vehicle seat tilts toward the vehicle front side accompanying the movement of the seated vehicle occupant toward the vehicle front side. Therefore, load toward a vehicle obliquely upper front side is inputted to the floor cross member that structures the vehicle rear side mounting portion of the vehicle seat, and this floor cross member is displaced toward a vehicle obliquely upper front side.

In this way, at the time of a vehicle front collision, the floor member and the floor cross member are displaced in directions of separating the floor cross member and the floor panel from one another. Accordingly, in a vehicle body lower portion structure, it is desirable to form a structure that suppresses separation, at the time of a vehicle front collision, between a floor panel and a floor cross member that structures the vehicle rear side mounting portion of a vehicle seat.

In consideration of the above-described circumstances, an object of the present invention is to provide a vehicle body lower portion structure that can suppress separation, at the time of a vehicle front collision, between a floor panel and a floor cross member that structures the vehicle rear side mounting portion of a vehicle seat.

Solution to Problem

A vehicle body lower portion structure relating to a first aspect of the present invention comprises: a floor member that extends in a vehicle longitudinal direction at a vehicle lower side of a floor panel, and whose front end portion is joined to a rear end portion of a front side member, and that, together with the floor panel, forms a closed cross-section portion; a floor cross member that extends in a vehicle transverse direction at a vehicle upper side of the floor panel, and intersects the floor member as seen in plan view, and is joined to the floor panel, and structures a vehicle rear side mounting portion of a vehicle seat; and a reinforcing member that extends in the vehicle longitudinal direction within the closed cross-section portion, and reinforces the floor member, and intersects the floor cross member as seen in plan view.

In the vehicle body lower portion structure relating to the first aspect of the present invention, the floor member extends in the vehicle longitudinal direction at the vehicle lower side of the floor panel. The front end portion of the floor member is joined to the rear end portion of the front side member. Further, a closed cross-section portion is formed by the floor member and the floor panel.

On the other hand, the floor cross member is provided at a vehicle upper side of the floor panel, and the floor cross member is joined to the floor panel. This floor cross member extends in the vehicle transverse direction, and intersects the floor member as seen in plan view. Further, the floor cross member structures the vehicle rear side mounting portion of a vehicle seat.

By the way, at the time of a vehicle front collision, collision load toward the vehicle rear side is inputted to the floor member via the front side member. At this time, due to this collision load, the floor member attempts to bend so as to becomes convex toward the vehicle lower side.

Further, at the time of a vehicle front collision, because a seated vehicle occupant moves toward the vehicle front side due to inertia, the vehicle seat attempts to tilt toward the vehicle front side accompanying the movement of the seated vehicle occupant toward the vehicle front side. Therefore, load toward a vehicle obliquely upper front side is inputted to the floor cross member that structures the vehicle rear side mounting portion of the vehicle seat, and the floor cross member is displaced toward a vehicle obliquely upper front side.

Here, the reinforcing member that reinforces the floor member extends in the vehicle longitudinal direction within the closed cross-section portion that is formed by the floor member and the floor panel. As seen in plan view, the reinforcing member intersects the floor cross member. Namely, the portion of the floor member, which portion is reinforced by the reinforcing member, extends in the vehicle longitudinal direction so as to include the portion of the floor member which portion intersects the floor cross member.

Further, the occurrence of bending due to the aforementioned collision load at the portion, that is reinforced by the reinforcing member, of the floor member is suppressed, and this reinforced portion of the floor member is displaced toward a vehicle obliquely upper front side following the displacement of the floor cross member toward a vehicle obliquely upper front side. As a result, the floor member bends so as to become convex toward the vehicle upper side, with the rear end of the reinforcing member being the starting point.

In this way, in the invention relating to the first aspect, at the time of a vehicle front collision, the floor member bends so as to become convex toward the vehicle upper side with a region, that is at the vehicle rear side with respect to the floor cross member, being the starting point. Further, the portion, that intersects the floor cross member, of the floor member is displaced toward a vehicle obliquely upper front side together with the floor cross member. Accordingly, separation, at the time of a vehicle front collision, between the floor panel and the floor cross member that structures the vehicle rear side mounting portion of the vehicle seat, can be suppressed.

In a vehicle body lower portion structure relating to a second aspect, in the vehicle body lower portion structure relating to the first aspect, an intersection region joined portion, at which the floor cross member, the floor panel and the reinforcing member are joined, is formed at an intersection region where the floor member and the floor cross member intersect as seen in plan view.

In the vehicle body lower portion structure relating to the second aspect, the intersection region joined portion is formed at a region of intersection of the floor member and the floor cross member as seen in plan view. The floor cross member, the floor panel, and the reinforcing member are joined at the intersection region joined portion. Namely, these members are joined in a state in which the floor panel is nipped-in by the floor cross member and the reinforcing member at the intersection region. Due thereto, separation strength between the floor cross member and the floor panel at the time of a vehicle front collision can be improved. Further, at the time of a vehicle front collision, load toward a vehicle obliquely upper front side, that is inputted to the floor cross member, can be transmitted to the reinforcing member via the intersection region joined portion. Due thereto, at the time of a vehicle front collision, the floor member can be made to follow well the displacement of the floor cross member toward a vehicle obliquely upper front side.

In a vehicle body lower portion structure relating to a third aspect, in the vehicle body lower portion structure relating to the first or second aspect, a first rear side joined portion, at which the floor panel, a rear end portion of the reinforcing member, and the floor member are joined, is formed at a vehicle rear side of the intersection region, and a second rear side joined portion, at which the floor panel and the floor member are joined, is formed at a vehicle rear side of the first rear side joined portion, and a rear end of the reinforcing member is disposed between the first rear side joined portion and the second rear side joined portion in the vehicle longitudinal direction.

In the vehicle body lower portion structure relating to the third aspect, the first rear side joined portion is formed at the vehicle rear side of the intersection region of the floor member and the floor cross member. The floor panel, the rear end portion of the reinforcing member, and the floor member are joined at the first rear side joined portion. Further, the second rear side joined portion is formed at the vehicle rear side of the first rear side joined portion, and the floor panel and the floor member are joined at the second rear side joined portion.

Further, the rear end of the reinforcing member is disposed between the first rear side joined portion and the second rear side joined portion, in the vehicle longitudinal direction. Namely, the rear end of the reinforcing member is disposed between the first rear side joined portion and the second rear side joined portion that are structured to have high strength at the floor member. Therefore, at the time of a vehicle front collision, the floor member can be bent stably at the position of the rear end of the reinforcing member.

In a vehicle body lower portion structure relating to a fourth aspect, in the vehicle body lower portion structure relating to any one of the first through third aspects, a front end of the reinforcing member is disposed further toward a vehicle front side than a joined portion of a rear end portion of the front side member and a front end portion of the floor member.

In the vehicle body lower portion structure relating to the fourth aspect, the joined portion of the front side member and the floor member is reinforced by the reinforcing member. Due thereto, bending of the joined portion of the front side member and the floor member at the time of a vehicle front collision can be suppressed.

In a vehicle body lower portion structure relating to a fifth aspect, in the vehicle body lower portion structure relating to any one of the first through fourth aspects, the floor member and the reinforcing member are each formed in a hat shape in cross-section that opens toward a vehicle upper side.

In a vehicle body lower portion structure relating to a sixth aspect, in the vehicle body lower portion structure relating to any one of the first through fourth aspects, the floor member and the reinforcing member are each formed in a substantial U-shape in cross-section that opens toward a vehicle upper side.

In a vehicle body lower portion structure relating to a seventh aspect, in the vehicle body lower portion structure relating to the fifth or sixth aspect, the floor member and the reinforcing member each have flange portions that extend toward vehicle transverse direction outer sides, and concave portions, for placement of the flange portions of the reinforcing member, are formed at the flange portions of the floor member.

Advantageous Effects of Invention

In accordance with the vehicle body lower portion structure relating to the first aspect, separation, at the time of a vehicle front collision, between the floor panel and the floor cross member that structures the vehicle rear side mounting portion of the vehicle seat can be suppressed.

In accordance with the vehicle body lower portion structure relating to the second aspect, at the time of a vehicle front collision, the floor member can be made to follow well displacement of the floor cross member toward a vehicle obliquely upper front side.

In accordance with the vehicle body lower portion structure relating to the third aspect, at the time of a vehicle front collision, the floor member can be bent stably at the position of the rear end of the reinforcing member.

In accordance with the vehicle body lower portion structure relating to the fourth aspect, bending of the joined portion of the front side member and the floor member at the time of a vehicle front collision can be suppressed.

BRIEF DESCRIPTION OF DRAWINGS

FIG. 5 is a side view corresponding to FIG. 1, for explaining behavior of the floor member and the second floor cross member at the time of a vehicle front collision.

DESCRIPTION OF EMBODIMENTS

Figure 1:
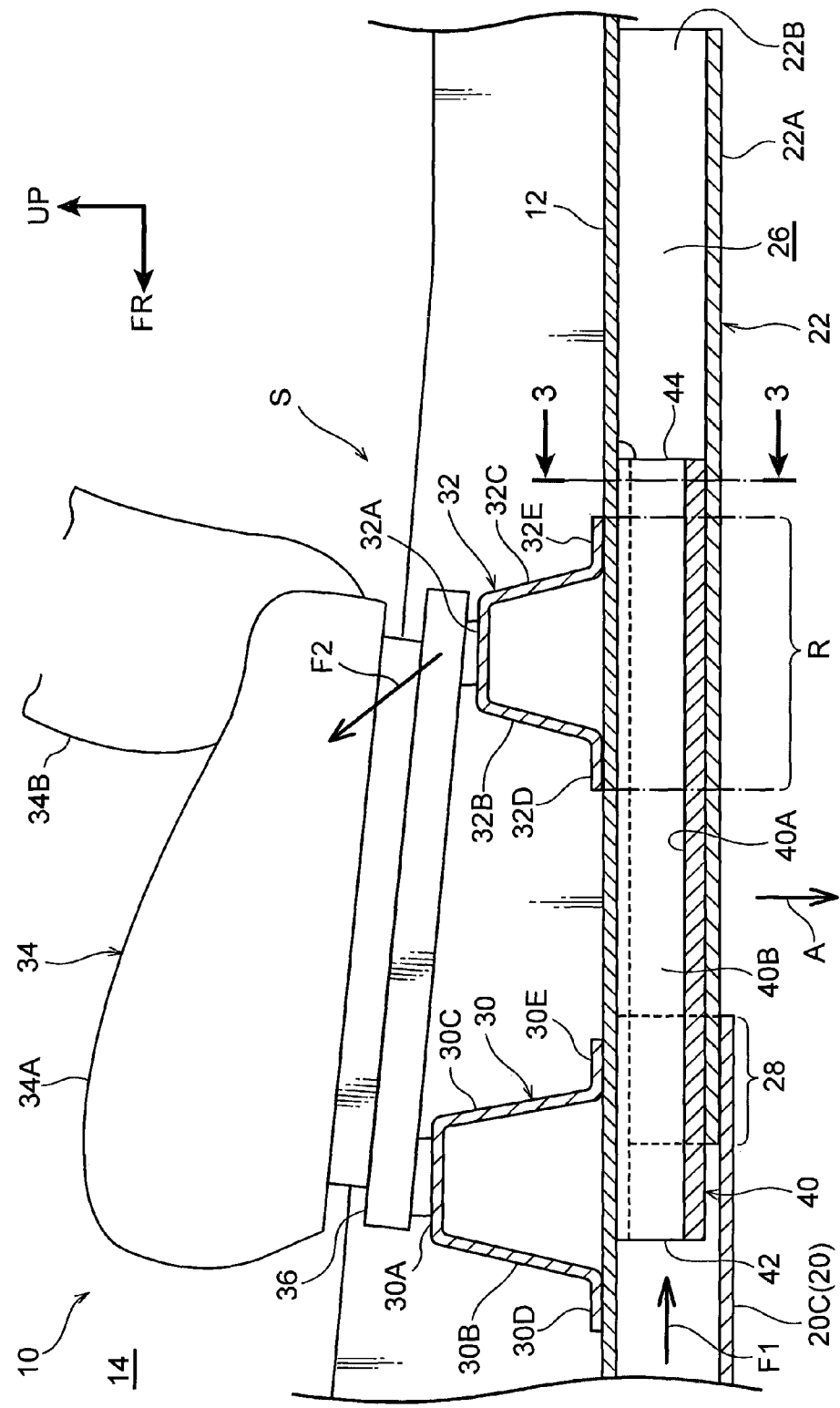
FIG. 1 is a side sectional view seen from a vehicle left side and showing main portions of a vehicle to which a vehicle body lower portion structure of the present embodiment is applied.

A vehicle (automobile) 10, to which a vehicle body lower portion structure S relating to the present embodiment is applied, is described hereinafter by using the drawings. Note that arrow FR that is shown appropriately in the drawings indicates the vehicle front side, arrow LH indicates the vehicle left side (a vehicle transverse direction one side), and arrow UP indicates the vehicle upper side.

Figure 2:
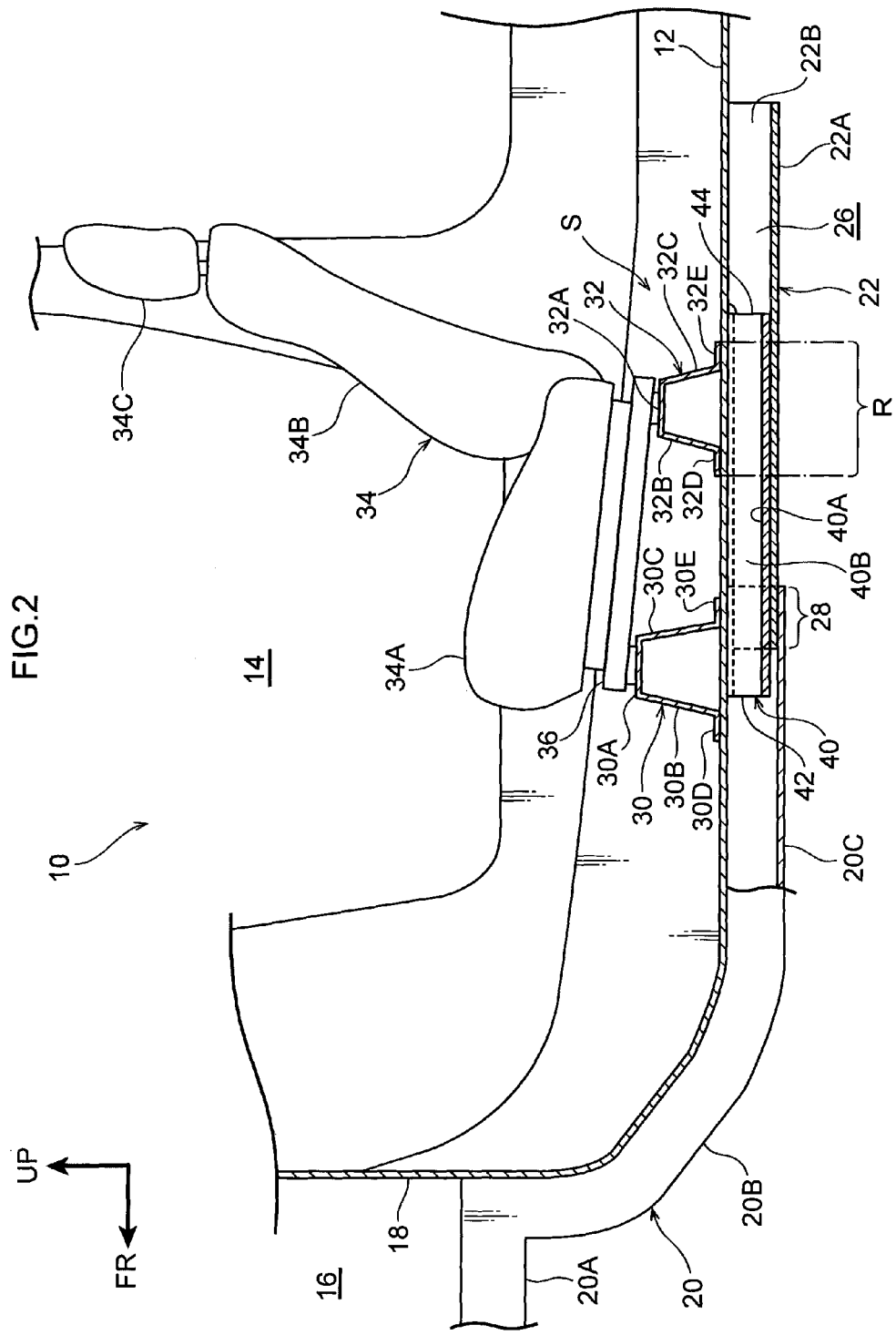
FIG. 2 is a side sectional view seen from the vehicle left side and showing the vicinity of a floor panel of the vehicle shown in FIG. 1.

As shown in FIG. 2, the vehicle 10 has a floor panel 12 that structures a vehicle body floor. The floor panel 12 is disposed such that the plate thickness direction thereof is the vehicle vertical direction. Rockers (not illustrated) that structure skeleton members of the vehicle 10 extend in the vehicle longitudinal direction at the vehicle transverse direction both sides of this floor panel 12. The vehicle transverse direction both end portions of the floor panel 12 are joined by welding or the like to the rockers.

Further, a dash panel 18, that divides a vehicle cabin 14 and a power unit chamber 16, is provided at the vehicle front side of the floor panel 12. This dash panel 18 is disposed such that the plate thickness direction thereof is the substantially vehicle longitudinal direction, and the lower portion of the dash panel 18 is inclined toward the vehicle rear side while heading toward the vehicle lower side as seen in side view. Further, the lower end portion of the dash panel 18 is joined by welding or the like to the front end portion of the floor panel 12. Note that the joined portion of the dash panel 18 and the floor panel 12 is not illustrated.

Moreover, the vehicle 10 has front side members 20. The front side members 20 are disposed at both sides of the vehicle 10 and extend in the vehicle longitudinal direction. Further, the front side member 20 has a front side member main body portion 20A that is disposed at the power unit chamber 16 of the vehicle 10, and a kick-up portion 20B that is bent obliquely downward from the rear end portion of the front side member main body portion 20A along the front surface of the dash panel 18. Moreover, the front side member 20 has a front side member rear portion 20C. The front side member rear portion 20C extends toward the vehicle rear side from the lower end portion of the kick-up portion 20B along the bottom surface of the floor panel 12.

The front side member main body portion 20A is formed in substantially rectangular closed cross-sectional shape, and extends rectilinearly in the vehicle longitudinal direction. Further, the kick-up portion 20B and the front side member rear portion 20C of the front side member 20 are formed in substantial hat shapes in cross-section that open substantially toward the vehicle upper side, as seen from the length direction of the front side member 20. Further, the open end portion of the kick-up portion 20B is joined to the dash panel 18, and the open end portion of the front side member rear portion 20C is joined to the floor panel 12.

Figure 3:
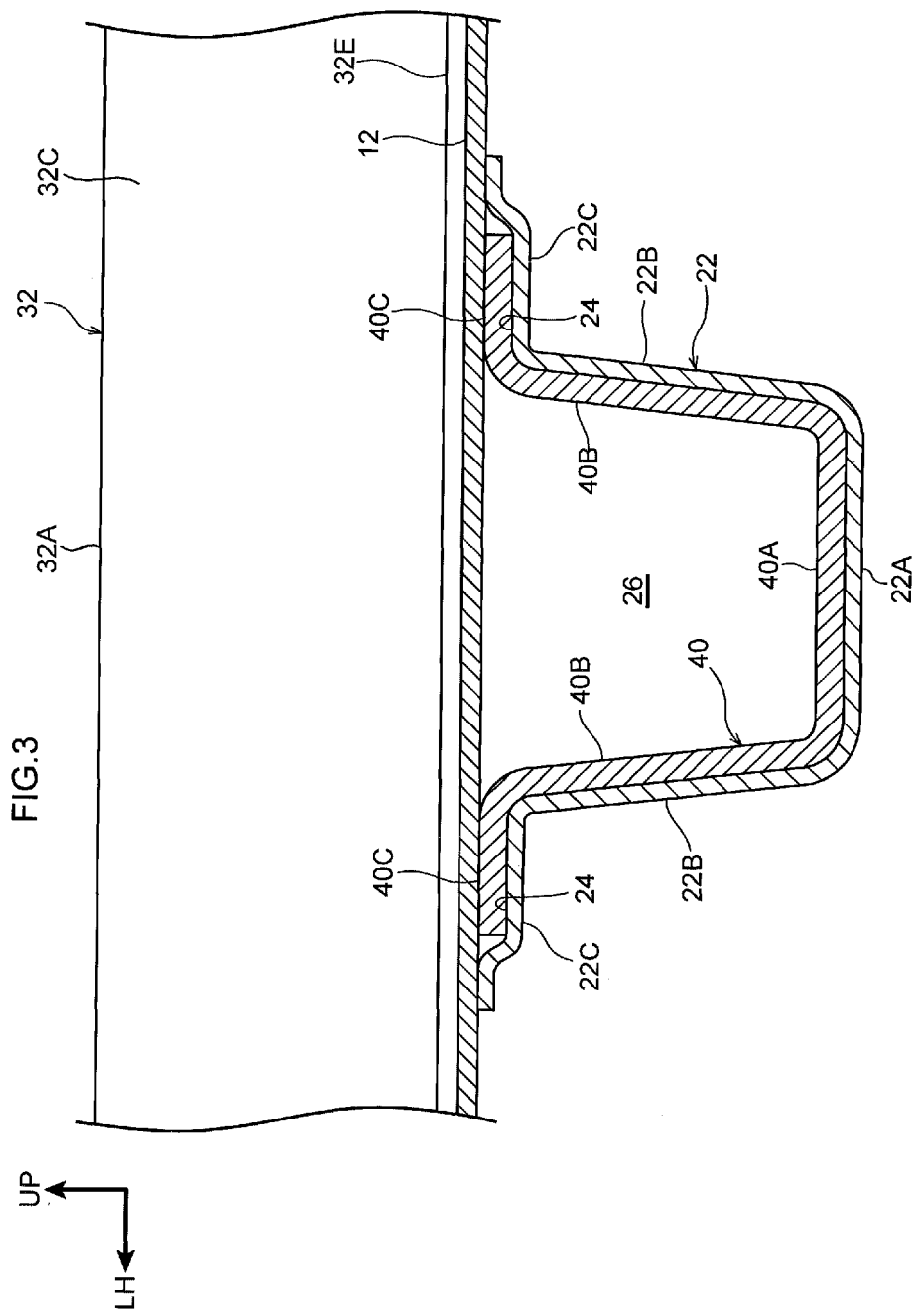
FIG. 3 is an enlarged cross-sectional view (a cross-sectional view along line 3-3 of FIG. 1) seen from a vehicle rear side and showing a floor member and a floor member reinforcement shown in FIG. 1.

A floor member 22 is provided at the vehicle rear side of the front side member rear portion 20C. This floor member 22 extends in the vehicle longitudinal direction, and is formed in a hat shape in cross-section that opens toward the vehicle upper side as seen from the length direction. Concretely, as shown in FIG. 3, the floor member 22 is structured to include a bottom wall 22A whose plate thickness direction is the vehicle vertical direction, a pair of side walls 22B that extend toward the vehicle upper side from the vehicle transverse direction both ends of the bottom wall 22A respectively, and flange portions 22C that extend toward the vehicle transverse direction outer sides from the upper ends of the side walls 22B.

Further, concave portions 24, for placement of flange portions 40C of a floor member reinforcement 40 that is described later, are formed at the flange portions 22C of the floor member 22. The concave portions 24 project toward the vehicle lower side and open toward the vehicle upper side. Further, the flange portions 22C of the floor member 22 are, at the portions thereof other than the concave portions 24, joined to the floor panel 12 by welding or the like. Due thereto, a closed cross-section portion 26 is formed by the floor member 22 and the floor panel 12.

Moreover, as shown in FIG. 1 and FIG. 2, the front end portion of the floor member 22 is disposed between the floor panel 12 and the rear end portion of the front side member rear portion 20C, and is disposed so as to overlap the rear end portion of the front side member rear portion 20C in the vehicle vertical direction. Further, the portion where the floor member 22 and the front side member 20 (the front side member rear portion 20C) overlap is an overlap portion 28, and the floor member 22 and the front side member 20 are joined by welding or the like at the overlap portion 28.

On the other hand, a first floor cross member 30 is provided at the vehicle upper side of the floor panel 12. The first floor cross member 30 extends in the vehicle transverse direction, and intersects the front side member rear portion 20C as seen in plan view. Further, the first floor cross member 30 is formed in a hat shape in cross-section that opens toward the vehicle lower side as seen from the length direction of the first floor cross member 30. Concretely, the first floor cross member 30 has a top wall 30A whose plate thickness direction is the vehicle vertical direction, and a front wall 30B and a rear wall 30C that extend toward the vehicle lower side from the front and rear ends of the top wall 30A respectively. Further, the first floor cross member 30 has a front side flange portion 30D that extends toward the vehicle front side from the lower end of the front wall 30B, and a rear side flange portion 30E that extends toward the vehicle rear side from the lower end of the rear wall 30C. Further, the front side flange portion 30D and the rear side flange portion 30E are joined by welding or the like to the floor panel 12, and a closed cross-section portion is formed by the first floor cross member 30 and the floor panel 12.

Further, a second floor cross member 32 serving as a "floor cross member" is provided at the vehicle upper side of the floor panel 12 at a position that is at the vehicle rear side with respect to the first floor cross member 30. The second floor cross member 32 extends in the vehicle transverse direction, and intersects the floor member 22 as seen in plan view. Further, in the same way as the first floor cross member 30, the second floor cross member 32 is formed in a hat shape in cross-section that opens toward the vehicle lower side as seen from the length direction. Concretely, the second floor cross member 32 has a top wall 32A whose plate thickness direction is the vehicle vertical direction, and a front wall 32B and a rear wall 32C that extend toward the vehicle lower side from the front and rear ends of the top wall 32A respectively. Further, the second floor cross member 32 has a front side flange portion 32D that extends toward the vehicle front side from the lower end of the front wall 32B, and a rear side flange portion 32E that extends toward the vehicle rear side from the lower end of the rear wall 32C. Further, the front side flange portion 32D and the rear side flange portion 32E are joined by welding or the like to the floor panel 12, and a closed cross-section portion is formed by the second floor cross member 32 and the floor panel 12. Further, the position, in the vehicle vertical direction, of the top wall 32A of the second cross member 32 is set so as to be slightly further toward the vehicle lower side than the position, in the vehicle vertical direction, of the top wall 30A of the first floor cross member 30.

Moreover, a vehicle seat 34 is provided at the vehicle upper side of the first floor cross member 30 and the second floor cross member 32. The vehicle seat 34 has a seat cushion 34A on which a vehicle occupant sits, a seat back 34B that supports the back portion of the seated vehicle occupant, and a headrest 34C that supports the head portion of the seated vehicle occupant. Further, the vehicle seat 34 is connected to the first floor cross member 30 and the second floor cross member 32 by rails 36 that support the seat cushion 34A slidably in the vehicle longitudinal direction. The rails 36 are formed in substantially elongated shapes that extend in the vehicle longitudinal direction. The front end portions of the rails 36 are fixed to the top wall 30A of the first floor cross member 30, and the rear end portions of the rails 36 are fixed to the top wall 32A of the second floor cross member 32. Due thereto, the first floor cross member 30 structures the vehicle front side mounting portion of the vehicle seat 34, and the second floor cross member 32 structures the vehicle rear side mounting portion of the vehicle seat 34.

The floor member reinforcement (hereinafter called "floor member RF") 40, that serves as a "reinforcing member" and is a main portion of the present invention, is described next.

The floor member RF 40 is provided within the closed cross-section portion 26 that is formed by the floor member 22 and the floor panel 12. This floor member RF 40 is structured by a steel plate or the like that is thicker than the plate thickness of the floor member 22, and extends in the vehicle longitudinal direction, and is formed in a hat shape in cross-section that opens toward the vehicle upper side as seen from the length direction. Concretely, as shown in FIG. 3, the floor member RF 40 is structured to include a bottom wall 40A whose plate thickness direction is the vehicle vertical direction, a pair of side walls 40B that extend toward the vehicle upper side from the vehicle transverse direction both ends of the bottom wall 40A respectively, and the pair of flange portions 40C that extend toward the vehicle transverse direction outer sides from the upper ends of the side walls 40B.

Further, as shown in FIG. 2, the rear portion of the floor member RF 40 overlaps the second floor cross member 32 in the vehicle vertical direction. In other words, as seen in plan view, the rear portion of the floor member RF 40 intersects the second floor cross member 32, and the floor member RF 40 extends toward the vehicle front side from an intersection region R where the floor member 22 and the second floor cross member 32 intersect. Further, a front end 42 of the floor member RF 40 is disposed at the vehicle front side with respect to the overlap portion 28 of the floor member 22 and the front side member 20, and is disposed adjacent to the overlap portion 28. In other words, the front end portion of the floor member RF 40 overlaps the overlap portion 28 in the vehicle vertical direction. On the other hand, a rear end 44 of the floor member RF 40 is disposed at the vehicle rear side with respect to the second floor cross member 32, and is disposed adjacent to the second floor cross member 32.

Moreover, the flange portions 40C of the floor member RF 40 are disposed between the floor panel 12 and the concave portions 24 of the flange portions 22C at the floor member 22, and are joined to the floor panel 12 by spot welding.

Joining of the second floor cross member 32, the floor panel 12, the floor member RF 40 and the floor member 22 at the vicinity of the intersection region R where the floor member 22 and the second floor cross member 32 intersect, is described next.

Figure 4:
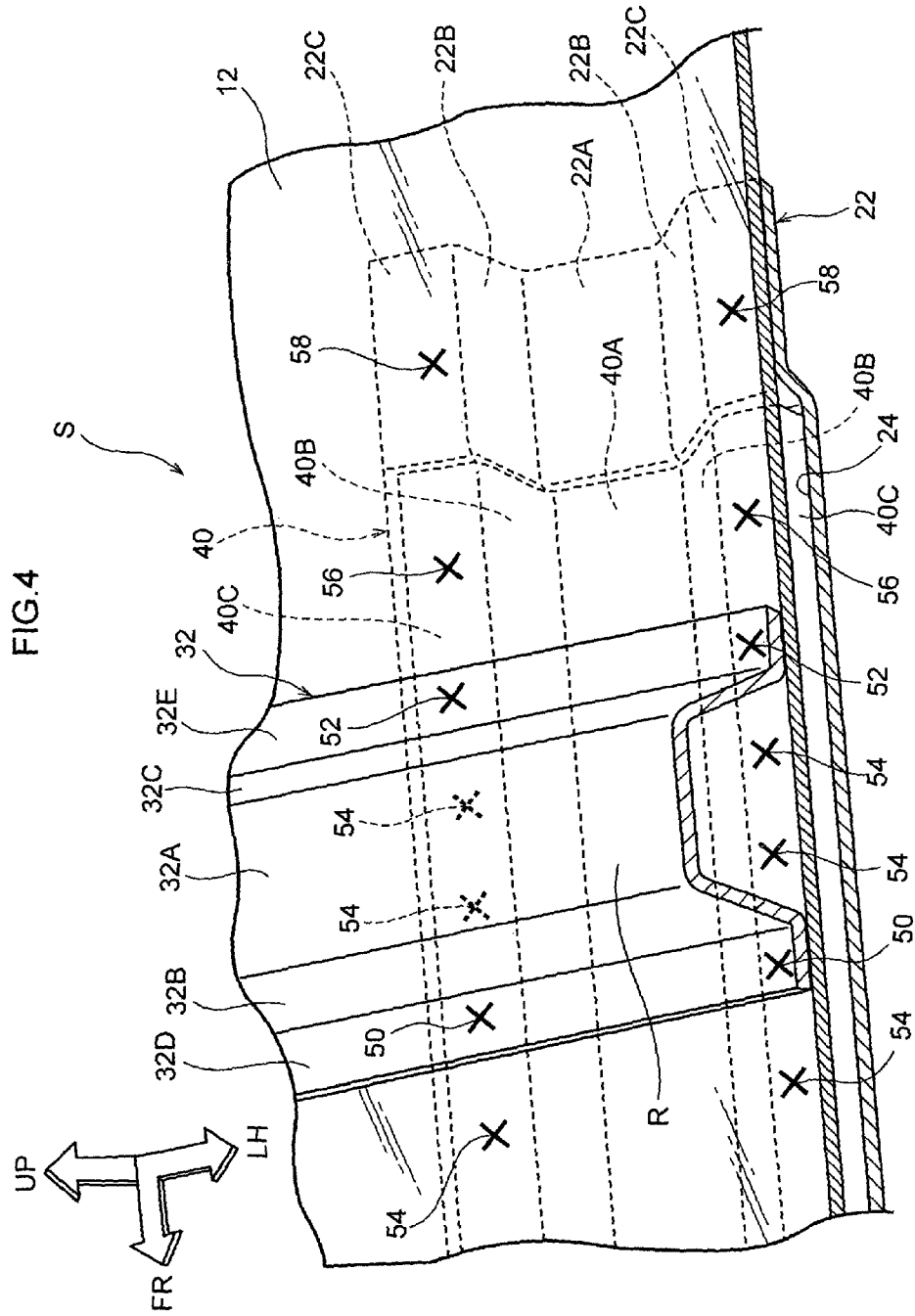
FIG. 4 is a partially-broken perspective view seen from a vehicle obliquely upper left side, for explaining joining at the vicinity of an intersection region where the floor member and a second floor cross member that are shown in FIG. 1 intersect.

As shown in FIG. 4, at the intersection region R, the front side flange portion 32D of the second floor cross member 32, the floor panel 12, and the flange portions 40C of the floor member RF 40 overlap one another in the vehicle vertical direction and are joined by spot welding. Further, these joined portions are first joined portions 50 that serve as "intersection region joined portions". Note that welding holes, that are not illustrated and are for spot welding the aforementioned three members, are formed in the flange portions 22C of the floor member 22 at positions, corresponding to the first joined portions 50.

Further, at the intersection region R, the rear side flange portion 32E of the second floor cross member 32, the floor panel 12, and the flange portions 40C of the floor member RF 40 overlap one another in the vehicle vertical direction and are joined by spot welding. Further, these joined portions are second joined portions 52 that serve as "intersection region joined portions". Note that, in the same way as described above, welding holes, that are not illustrated and are for spot welding the aforementioned three members, are formed in the flange portions 22C of the floor member 22 at positions corresponding to the second joined portions 52.

Moreover, the floor panel 12, the flange portions 40C of the floor member RF 40, and the flange portions 22C of the floor member 22 are joined by spot welding, and these joined portions are third joined portions 54, 56. Further, at the third joined portions 54, 56, reference numeral 56 is given to the third joined portions that are disposed at the vehicle rear side with respect to the intersection region R, and the third joined portions 56 are "first rear side joined portions" of the present invention. Namely, the floor panel 12, and the flange portions 40C at the rear end portion of the floor member RF 40 (in detail, the portion of the floor member RF 40 which portion is further toward the vehicle rear side than the second floor cross member 32), and the flange portions 22C of the floor member 22 are joined at the third joined portions 56.

Further, at the vehicle rear side of the third joined portions 56, the floor panel 12 and the flange portions 22C of the floor member 22 are joined by spot welding, and these joined portions are fourth joined portions 58 that serve as "second rear side joined portions". Further, the rear end 44 of the floor member RF 40 is disposed between the third joined portions 56 and the fourth joined portions 58 as seen in plan view.

(Operation and Effects)

Separation between the second floor cross member 32 and the floor panel 12 at the time of a vehicle front collision is described next in comparison with a vehicle of a comparative example. Note that the floor member RF 40 of the present embodiment is omitted from the vehicle of the comparative example, but, other than this point, the vehicle of the comparative example is structured similarly to the present embodiment.

At the time of a vehicle front collision, collision load F1 toward the vehicle rear side is inputted to the front side member 20. Further, the collision load F1 is transmitted via the kick-up portion 20B of the front side member 20 to the front side member rear portion 20C, and is inputted from the front side member rear portion 20C of the floor member 22

(refer to arrow F1 of FIG. 1). Further, in the vehicle of the comparative example, because the floor member 22 is not reinforced by the floor member RF 40, when the collision load F1 is inputted to the floor member 22, the floor member 22 tends bend so as to become convex toward the vehicle lower side (refer to arrow A of FIG. 1).

Further, at the time of a vehicle front collision, a seated vehicle occupant moves toward the vehicle front side due to inertia, and therefore, the vehicle seat 34 tilts toward the vehicle front side accompanying the movement of the seated vehicle occupant toward the vehicle front side. Thus, load F2 toward a vehicle obliquely upper front side (refer to arrow F2 of FIG. 1) is inputted to the second floor cross member 32 that structures the vehicle rear side mounting portion of the vehicle seat 34, and the second floor cross member 32 is displaced toward a vehicle obliquely upper front side. Due thereto, in the vehicle of the comparative example, the floor member 22 and the second floor cross member 32 are displaced in directions of separating the second floor cross member 32 and the floor panel 12 from one another.

On the other hand, in the vehicle 10 to which the vehicle body lower portion structure S of the present embodiment is applied, the floor member RF 40 that reinforces the floor member 22 extends in the vehicle longitudinal direction within the closed cross section portion 26 that is formed by the floor member 22 and the floor panel 12. Further, the floor member RF 40 intersects the second floor cross member 32 as seen in plan view. Namely, the portion of the floor member 22, which portion is reinforced by the floor member RF 40, extends in the vehicle longitudinal direction so as to include the portion of the floor member 22 which portion intersects the second floor cross member 32.

Further, as shown in FIG. 5, the occurrence of bending due to the aforementioned collision load F1 at the portion, that is reinforced by the floor member RF 40, of the floor member 22 is suppressed, and this reinforced portion of the floor member 22 is displaced toward a vehicle obliquely upper front side following the displacement of the second floor cross member 32 toward a vehicle obliquely upper front side. As a result, the floor member 22 bends so as to become convex toward the vehicle upper side with the rear end 44 of the floor member RF 40 being the starting point.

In this way, in accordance with the vehicle body lower portion structure S relating to the present embodiment, the floor member 22 bends so as to become convex toward the vehicle upper side, with a region at the vehicle rear side of the second floor cross member 32 being the starting point. Further, the portion of the floor member 22, which portion intersects the second floor cross member 32, is displaced toward a vehicle obliquely upper front side together with the second floor cross member 32. Accordingly, separation, at the time of a vehicle front collision, between the floor panel 12 and the second floor cross member 32 that structures the vehicle rear side mounting portion of the vehicle seat 34 can be suppressed.

Further, the first joined portions 50 and the second joined portions 52 are formed at the intersection region R of the floor member RF 40 and the second floor cross member 32. Further, the front side flange portion 32D of the second floor cross member 32, the floor panel 12, and the flange portions 40C of the floor member RF 40 are joined at the first joined portions 50. Further, the rear side flange portion 32E of the second floor cross member 32, the floor panel 12, and the flange portions 40C of the floor member RF 40 are joined at the second joined portions 52. Namely, at the intersection region R, these three members are joined in a state in which the floor panel 12 is nipped-in by the second floor cross member 32 and the floor member RF 40. Due thereto, the separation strength between the second floor cross member 32 and the floor panel 12 at the time of a vehicle front collision can be improved. Further, at the time of a vehicle front collision, the load F2 toward a vehicle obliquely upper front side that is inputted to the second floor cross member 32 can be transmitted via the first joined portions 50 and the second joined portions 52 to the floor member RF 40. Due thereto, at the time of a vehicle front collision, the floor member 22 (the floor member RF 40) can be made to follow well the displacement of the second floor cross member 32 toward a vehicle obliquely upper front side.

Moreover, the floor panel 12, the flange portions 40C at the rear end portion of the floor member RF 40, and the flange portions 22C of the floor member 22 are joined at the third joined portions 56. Further, the floor panel 12 and the flange portions 22C of the floor member 22 are joined at the fourth joined portions 58. Further, the rear end 44 of the floor member RF 40 is disposed between the third joined portions 56 and the fourth joined portions 58 in the vehicle longitudinal direction. Namely, the rear end 44 of the floor member RF 40 is disposed between the third joined portions 56 and the fourth joined portions 58 that are structured to have high strength at the floor member 22. Therefore, at the time of a vehicle front collision, the floor member 22 can be bent stably at the position of the rear end 44 of the floor member RF 40.

Further, the front end 42 of the floor member RF 40 is disposed at the vehicle front side with respect to the overlap portion 28 of the floor member 22 and the front side member 20, and is disposed adjacent to the overlap portion 28. In other words, the front end portion of the floor member RF 40 is disposed so as to overlap the overlap portion 28 as seen in plan view. Therefore, the joined portion of the front side member 20 and the floor member 22 is reinforced by the floor member RF 40. Due thereto, bending of the joined portion of the front side member 20 and the floor member at the time of a vehicle front collision is suppressed. As a result, the portion of the floor member 22, which portion is reinforced by the floor member RF 40, can be made to follow even more the displacement of the second floor cross member 32 toward a vehicle obliquely upper front side.

Note that, in the present embodiment, the floor member RF 40 and the floor member 22 are formed in hat shapes in cross-section. However, the cross-sectional shapes of the floor member RF 40 and the floor member 22 are not limited to this. For example, the floor member RF 40 and the floor member 22 may be formed in substantial U-shapes in cross-section that open toward the vehicle upper side.

Further, in the present embodiment, the rear end 44 of the floor member RF 40 is disposed at the vehicle rear side of and adjacent to the second floor cross member 32 as seen in plan view. However, the position, in the vehicle longitudinal direction, of the rear end 44 may be changed appropriately at the vehicle rear side of the second floor cross member 32.

The disclosure of Japanese Patent Application No. 2013-246604 is, in its entirety, incorporated by reference into the present specification.

All publications, patent applications, and technical standards mentioned in the present specification are incorporated by reference into the present specification to the same extent as if each individual publication, patent application or technical standard was specifically and individually indicated to be incorporated by reference.

EXPLANATION OF REFERENCE NUMERALS 12 floor panel
20 front side member 22 floor member
26 closed cross-section portion
32 second floor cross member (floor cross member)
34 vehicle seat
40 floor member reinforcement (reinforcing member)
42 front end of reinforcing member
44 rear end of reinforcing member
50 first joined portion (intersection region joined portion)
52 second joined portion (intersection region joined portion)
56 third joined portion (first rear side joined portion)
58 fourth joined portion (second rear side joined portion)
S vehicle body lower portion structure
R intersection region

The invention claimed is:

1. A vehicle body lower portion structure, comprising:
a floor member that extends in a vehicle longitudinal direction at a vehicle lower side of a floor panel, wherein the floor member includes a front end portion that is joined to a rear end portion of a front side member and, together with the floor panel, forms a closed cross-section portion;
a floor cross member that extends in a vehicle transverse direction at a vehicle upper side of the floor panel and intersects the floor member as seen in plan view, wherein the floor cross member is joined to the floor panel and is a vehicle rear side mounting portion of a vehicle seat; and
a reinforcing member that extends in the vehicle longitudinal direction within the closed cross-section portion and reinforces the floor member, wherein the reinforcing member intersects the floor cross member as seen in plan view,
wherein an intersection region joined portion, at which the floor cross member, the floor panel and the reinforcing member are joined, is formed at an intersection region where the floor member and the floor cross member intersect as seen in plan view, and
wherein a first rear side joined portion, at which the floor panel, a rear end portion of the reinforcing member, and the floor member are joined, is formed at a vehicle rear side of the intersection region,
a second rear side joined portion, at which the floor panel and the floor member are joined, is formed at a vehicle rear side of the first rear side joined portion, and
a rear end of the reinforcing member is disposed between the first rear side joined portion and the second rear side joined portion in the vehicle longitudinal direction.

2. A vehicle body lower portion structure, comprising:
a floor member that extends in a vehicle longitudinal direction at a vehicle lower side of a floor panel, wherein the floor member includes a front end portion that is joined to a rear end portion of a front side member and, together with the floor panel, forms a closed cross-section portion;
a floor cross member that extends in a vehicle transverse direction at a vehicle upper side of the floor panel and intersects the floor member as seen in plan view, wherein the floor cross member is joined to the floor panel and is a vehicle rear side mounting portion of a vehicle seat; and
a reinforcing member that extends in the vehicle longitudinal direction within the closed cross-section portion and reinforces the floor member, wherein the reinforcing member intersects the floor cross member as seen in plan view,
wherein a front end of the reinforcing member is disposed further toward a vehicle front side than a joined portion of a rear end portion of the front side member and a front end portion of the floor member.

3. A vehicle body lower portion structure, comprising:
a floor member that extends in a vehicle longitudinal direction at a vehicle lower side of a floor panel, wherein the floor member includes a front end portion that is joined to a rear end portion of a front side member and, together with the floor panel, forms a closed cross-section portion;
a floor cross member that extends in a vehicle transverse direction at a vehicle upper side of the floor panel and intersects the floor member as seen in plan view, wherein the floor cross member is joined to the floor panel and is a vehicle rear side mounting portion of a vehicle seat; and
a reinforcing member that extends in the vehicle longitudinal direction within the closed cross-section portion and reinforces the floor member, wherein the reinforcing member intersects the floor cross member as seen in plan view,
wherein the floor member and the reinforcing member are each formed in a hat shape in cross-section that opens toward a vehicle upper side, and
wherein the floor member and the reinforcing member each have flange portions that extend toward vehicle transverse direction outer sides, and concave portions, for placement of the flange portions of the reinforcing member, are formed at the flange portions of the floor member.

4. A vehicle body lower portion structure, comprising:
a floor member that extends in a vehicle longitudinal direction at a vehicle lower side of a floor panel, wherein the floor member includes a front end portion that is joined to a rear end portion of a front side member and, together with the floor panel, forms a closed cross-section portion;
a floor cross member that extends in a vehicle transverse direction at a vehicle upper side of the floor panel and intersects the floor member as seen in plan view, wherein the floor cross member is joined to the floor panel and is a vehicle rear side mounting portion of a vehicle seat; and
a reinforcing member that extends in the vehicle longitudinal direction within the closed cross-section portion and reinforces the floor member, wherein the reinforcing member intersects the floor cross member as seen in plan view,
wherein the floor cross member includes a first flange portion on a first side of the floor cross member and a second flange portion on a second side of the floor cross member, the first and second flange portions each extend in the vehicle longitudinal direction, and
wherein the reinforcing member intersects each of the first flange portion and the second flange portion.

* * * * *